United States Patent
Dickey et al.

(10) Patent No.: US 6,805,154 B1
(45) Date of Patent: Oct. 19, 2004

(54) FREEZE PROTECTION DEVICE FOR WALL HYDRANTS/FAUCETS

(75) Inventors: Alfred F. Dickey, Colorado Springs, CO (US); Cody W. Jackson, Colorado Springs, CO (US); William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 0 days.

(21) Appl. No.: 10/729,778

(22) Filed: Dec. 5, 2003

(51) Int. Cl.[7] .............. E03B 7/12; E03C 1/10; F16K 31/64
(52) U.S. Cl. ............ 137/360; 137/59; 137/60; 137/61; 137/62; 137/218; 137/512.3; 137/540; 137/543.17; 137/614.18; 137/614.2; 137/614.21; 137/854; 138/27; 138/32
(58) Field of Search .............. 137/59, 60, 61, 137/62, 78.1, 79, 80, 218, 512, 512.3, 535, 540, 541, 301, 302, 543.17, 599.18, 614.18, 614.2, 614.21, 843, 852, 854; 138/27, 32

(56) References Cited

U.S. PATENT DOCUMENTS

| | | | | |
|---|---|---|---|---|
| 4,112,966 A | * | 9/1978 | Carlson | 137/282 |
| 4,182,356 A | * | 1/1980 | Woodford, Sr. | 137/59 |
| 5,392,805 A | * | 2/1995 | Chrysler | 137/218 |
| 5,740,831 A | * | 4/1998 | DeNardo et al. | 137/218 |
| 6,142,172 A | * | 11/2000 | Shuler et al. | 137/360 |
| 6,532,986 B1 | * | 3/2003 | Dickey et al. | 137/360 |

* cited by examiner

*Primary Examiner*—George L. Walton

(57) ABSTRACT

A freezeless wall hydrant has a fluid inlet end connected to a source of pressurized water, and a fluid outlet end. A check valve is placed in the bore of the valve body and is spring loaded to open only when extreme water pressure within the inlet valve lifts a spring loaded piston element to permit the highly pressurized water to move through the bore in the valve body and be relieved as it escapes rearwardly into the original source of pressurized water.

6 Claims, 3 Drawing Sheets

FREEZE PROTECTION DEVICE FOR WALL HYDRANTS/FAUCETS

BACKGROUND OF THE INVENTION

Freezeless wall hydrants and faucets have long been in existence. They characteristically have a fluid closure valve located in the end of an inlet pipe located within the wall or a warmer interior area of the building of which the wall is a part. This closure valve is operated by an elongated rod connected to an exterior handle. The freezeless characteristics of the hydrant are caused by the closure valve shutting off the flow of water within the wall or building at a freezing temperature, with the residual water in the inlet pipe flowing by gravity outwardly through the conventional outlet drain of the hydrant.

The foregoing structure works very successfully except in situations where a hose or the like is attached to the outlet drain of the hydrant, whereupon the residual water is not able to easily flow by gravity out of the hydrant when the closure valve connected to the pressurized water is closed. With a hose attached during freezing weather, the residual water freezes within the hydrant, and the inlet pipe or related components thereupon rupture from the freezing conditions within the hydrant.

It has in recent times been recognized that the rupture of such a hydrant under freezing weather conditions does not take place because of the frozen water in the hydrant. Rather, the rupture results from the ice imposing severe pressure on the captivated non-frozen fluid in the inlet pipe. Thus, the increased pressure on this water by the expanded ice is the principal cause for the rupture of the hydrant.

Attempts have been made to permit some backflow to take place via spring loaded ball bearings (U.S. Pat. No. 6,142,172), but calcium deposits on the ball bearings sometimes inhibit the process.

Accordingly, it is a principal object of this invention to provide a freezeless wall hydrant which has the ability to drain at least some of the residual water in a hydrant when, under freezing conditions, the residual water towards the exterior part of the hydrant freezes by reason of a hose or the like being attached to the discharge nozzle.

It is a further object of this invention to provide a relief valve for the captured residual water under the foregoing conditions to escape back towards the supply of pressurized water when the frozen water in the exterior of the hydrant creates excessive pressure on the remainder of the residual water in the hydrant.

These and other objects will be apparent to those skilled in the art.

BRIEF SUMMARY OF THE INVENTION

A freezeless wall hydrant has an inlet pipe with one end connected to a source of pressurized water, a water discharge conduit, and an elongated control rod extending through the inlet pipe to open and close a fluid valve. A bore is inserted through the fluid valve with the bore being in communication with both the source of pressurized water and the interior portion of the inlet pipe. A check valve is placed in the bore of the valve body and is spring loaded to open only when extreme water pressure within the inlet valve lifts a spring loaded piston element to permit the highly pressurized water to move through the bore in the valve body and be relieved as it escapes rearwardly into the original source of pressurized water. The check valve is enclosed within a cylindrical housing and is force-fit into the bore of the valve body. The spring is of sufficient strength such that it will open the bore to fluid flow in a rearward direction only when the pressure within the outlet portion of the inlet conduit is greater than that of the pressurized source of water normally located upstream from the valve closure.

DESCRIPTION OF THE PREFERRED EMBODIMENTS OF THE INVENTION

Figure 1:
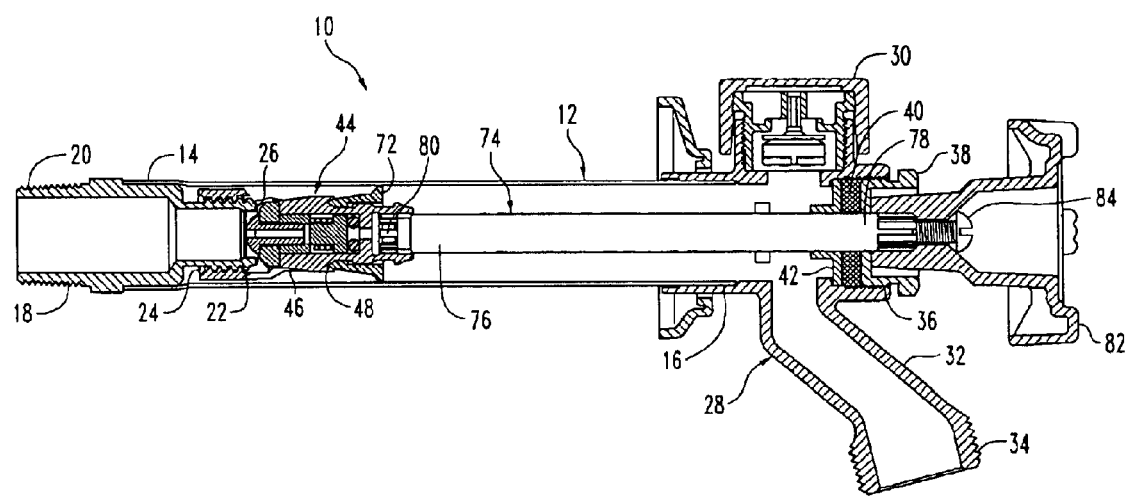
FIG. 1 is a longitudinal sectional view of the hydrant of this invention.

The hydrant 10 in FIG. 1 has an elongated hollow water inlet tube 12 which has an interior end 14 and an exterior end 16. A hollow valve fitting 18 is rearwardly secured to the interior end 14 of tube 12 and has a threaded end 20 adapted to be secured to a conduit connected to a source of pressurized fluid (not shown). The fitting 18 has an interior end 22 with external threads 24 and which terminate in a valve seat 26.

A casting member 28 has a conventional vacuum breaker 30 secured thereto and is rigidly connected to the exterior end 16 of inlet tube 12. A conventional fluid drain conduit 32 is located within casting member 28 and is in communication with the interior of tube 12. Conventional threads 34 are located on the discharge end of conduit 32 to receive a conventional hose or the like. Casting member 28 also has a threaded aperture 36 which is adapted to receive a conventional bushing 38 which in turn receives packing 40 which is held in tight engagement with bushing 38 by packing washer 42 (FIG. 1).

Figure 2:
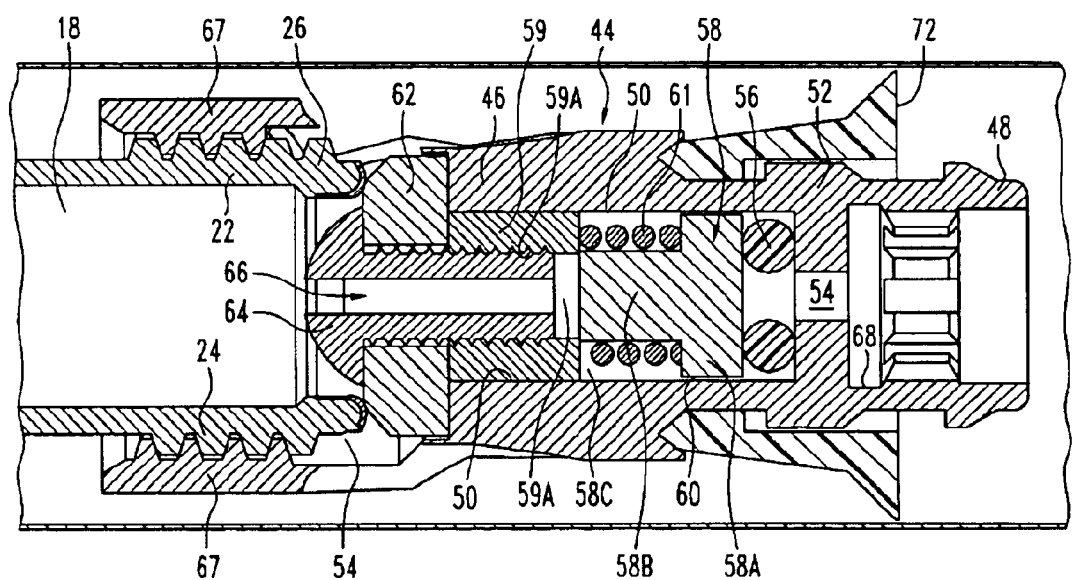
FIG. 2 is a large scale sectional view of the valve body in an opened condition which controls flow of pressurized water through the hydrant.
Figure 3:
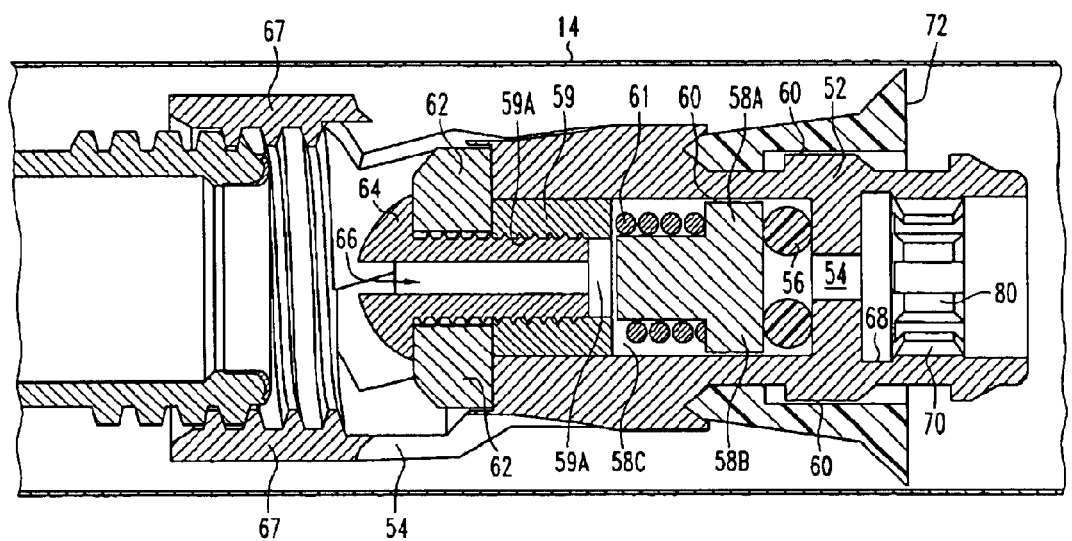
FIG. 3 is a sectional view similar to that of FIG. 2 but shows how the valve can allow high pressure backflow water downstream from the valve body to the supply water when ice in the hydrant compresses water adjacent the downstream side of the valve in a backflow direction.

Adjacent the interior end of valve fitting 18 is a valve body 44 adapted for longitudinal movement in the interior end of 14 of tube 12. Valve body 44 has an interior end 46, an exterior end 48 and an elongated center bore 50 extending therethrough (FIGS. 2 and 3). A shoulder 52 with center bore 54 is located in bore 50. A compressible sealing ring 56 is located in bore 50 adjacent shoulder 52. A T-shaped piston element or valve 58 having a circular top 58A and a rearwardly extending stem 58B of narrower diameter, creating a void 58C therearound. An internally threaded bushing 59 is frictionally mounted within the rearward end of bore 50. A bore 59A is located in bushing 59 adjacent the rearward end of stem 58B of piston element 58. Coil spring 61 is normally compressed between bushing 59 and piston top 58A to compress sealing ring 56. A space 60 is provided around the top 58A of piston element 58 to allow the passage of fluid from center bore 54, thence through space 60 when compression of ring 56 is relieved, as will be discussed hereafter.

A valve seat member 62 is mounted on screw 64 and has a center bore 66 and is received by the internal threads of bushing 59. The screw 64 binds the sealing member 62 to bushing 59 and valve body 44.

Threaded arms 67 extend rearwardly from body 44 and threadably engage the threads 24 on the interior end 22 of valve fitting 18.

A plurality of spherical spline teeth 70 extend outwardly from space 68. A conventional check valve member 72 extends around the spline teeth 70 and is adapted to engage the interior surface of the inlet tube 12. The check valve member 72 conventionally permits fluid flow only in a direction towards the drain conduit 32, but prevents fluid flow in the inlet pipe in opposite direction.

A conventional elongated rod control 74 is located within the inlet pipe 12 and has a rearward end 76 and a forward end 78. Spline grooves 80 are formed in the rearward end 76 of the rod control and are adapted to engage the spline teeth 70 located at the forward end of the body 44. A conventional handle wheel 82 is spline-mounted on the forward end 78 of rod control 74 and is held in place by conventional screw 84.

In the event that a hose is attached to the fluid drain conduit 32 in freezing temperatures, the residual water which ordinarily would flow out of the conduit 32 if the hose were not attached when the valve member 42 is in a closed condition will be captured within the conduit 32 and the interior of tube 12. This residual captured water will first begin to freeze in the discharge conduit 32 and adjacent the exterior end 16 of tube 12. The presence of ice in that portion of the hydrant will cause excessive pressure possibly as high as 4,000 PSI in unfrozen residual water in the end 14 of tube 12. This is because water volume expands by about 8% as it turns to ice. Ordinarily, water under that much pressure would rupture at least the inlet pipe 12. However, with the present invention, this increased pressure exerted on the residual water in the inlet pipe 12 occasioned by the formation of ice in the exterior end thereof will exert pressure on piston top 58A which will compress spring 61 against bushing 59 and thus releases the compression of ring 56. This will permit the highly compressed fluid in the rearward end of tube 12 to flow around the ring 56, thence around the top 58A through space 60, thence around spring 61, thence through bore 59A, thence the center bore 66 of screw 64, and thence into the interior of the water supply in valve fitting 18. The water pressure in valve fitting 18 is normally in the range of 55 PSI, so the above process will continue to balance the water pressure on both ends of the valve body 44, thus eliminating any rupture of the tube 12 caused by the freezing phenomenon.

Thus, from the foregoing, it is seen that this invention will keep the ordinary freezeless hydrant from becoming ruptured whenever a hose or the like is inadvertently left on the discharge conduit thereof. This successful result takes place because the formation of ice in such a hydrant under those conditions will permit the back flow of residual water in the hydrant to move through the otherwise closed hydrant valve into the original source of pressurized water. This relief of pressure will prevent the hydrant from rupturing under the freezing conditions. It is therefore seen that this invention will achieve all of its stated objectives.

What is claimed is:

1. A freezeless wall hydrant, comprising,
    a normally horizontal fluid inlet tube having an interior end and an exterior end,
    a hollow valve fitting rigidly secured to the interior end of the inlet tube for connection to a source of pressurized fluid,
    a valve seat on an interior end of the valve fitting,
    a casting member rigidly secured to the outer end of the inlet tube and including a drain conduit in communication with an interior of the inlet tube for discharging water from the hydrant,
    a valve body longitudinally movably mounted in the inlet tube adjacent the valve fitting,
    a valve sealing element on the valve body adapted to engage and disengage the valve seat to prevent or permit, respectively, a fluid flow through the valve fitting into the inlet tube,
    an elongated operating rod having a rearward end secured to the valve body and an outer end protruding from the casting member for longitudinally moving the valve body in the inlet tube,
    a bore in the valve body connecting the valve fitting and the inlet tube,
    a check valve in the bore of the valve body to normally prevent fluid flow either into or out of the inlet tube,
    a center bore in the valve body extending between a forwardly located aperture with a center bore and the valve sealing element located adjacent the rearward end of the valve body,
    a resilient sealing ring adjacent the forwardly located aperture,
    a valve element having an end portion adjacent the resilient sealing ring and a stem portion of smaller diameter extending in a rearwardly direction;
    a compression spring around the stem portion bearing against a rearward surface of the end portion of the piston element and normally urging the piston element to compress the resilient sealing ring to prevent the flow of fluid rearwardly through the inlet pipe and through the center bore of the valve body,
    a fluid conduit in the valve body having a rearward end communicating with the source of pressurized fluid, and a forward end communicating with the portion of the bore of the valve body occupied by the compression spring so that a source of fluid under pressure higher than a source of pressurized fluid adjacent the hollow valve fitting will cause the piston element to compress the compression spring to decompress the resilient sealing ring so that fluid will flow rearwardly through the valve body through the forwardly located aperture therein; thence through the resilient sealing ring, past the end portion of the valve element, past the compression spring, and into the fluid conduit of the valve body to the source of pressurized fluid adjacent the hollow valve fitting.

2. The hydrant of claim 1 wherein the fluid conduit in the valve body is a screw having a center bore, and holding the valve sealing element in place, with the center bore connecting the source of pressurized fluid to the bore in the valve body.

3. The hydrant of claim 2 wherein the screw is threaded into a hollow bushing mounted in the bore of the valve body.

4. A freezeless wall hydrant, comprising,
    a normally horizontal fluid inlet tube having an interior end and an exterior end,
    a hollow valve fitting rigidly secured to the interior end of the inlet tube for connection to a source of pressurized fluid,
    a valve seat on an interior end of the valve fitting,
    a valve body longitudinally movably mounted in the inlet tube adjacent the valve fitting,
    a valve sealing element on the valve body adapted to engage and disengage the valve seat to prevent or permit, respectively, a fluid flow through the valve fitting into the inlet tube,
    a bore in the valve body connecting the valve fitting and the inlet tube,
    a check valve in the bore of the valve body to normally prevent fluid flow either into or out of the inlet tube, a center bore in the valve body extending between a forwardly located aperture with a center bore and the valve sealing element located adjacent the rearward end of the valve body, a resilient sealing ring adjacent the forwardly located aperture, a valve element having an end portion adjacent the resilient sealing ring extending in a rearwardly direction, a compression spring bearing against a rearward surface of the valve element and normally urging the valve element to compress the resilient sealing ring to prevent the flow of fluid rearwardly through the inlet pipe and through the center bore of the valve body, a fluid conduit in the valve body having a rearward end communicating with the source of pressurized fluid, and a forward end communicating with the portion of the bore of the valve body occupied by the compression spring so that a source of fluid under pressure higher than a source of pressurized fluid adjacent the hollow valve fitting will cause the valve element to compress the compression spring to decompress the resilient sealing ring so that fluid will flow rearwardly through the valve body and into the fluid conduit of the valve body to the source of pressurized fluid adjacent the hollow valve fitting.

5. The hydrant of claim 4 wherein the fluid conduit in the valve body is a screw having a center bore, and holding the valve sealing element in place, with the center bore connecting the source of pressurized fluid to the bore in the valve body.

6. The hydrant of claim 5 wherein the screw is threaded into a hollow bushing mounted in the bore of the valve body.

* * * * *